United States Patent [19]

Cuccio

[11] 3,778,816

[45] Dec. 11, 1973

[54] KEYBOARD DATA ENTRY DEVICE EMPLOYING REACTIVE COUPLING CIRCUITS

[75] Inventor: Allen B. J. Cuccio, Oklahoma City, Okla.

[73] Assignee: General Electric Company

[22] Filed: May 3, 1972

[21] Appl. No.: 249,811

Related U.S. Application Data

[60] Continuation of Ser. No. 17,840, March 9, 1970, Division of Ser. No. 695,802, Jan. 4, 1968.

[52] U.S. Cl. ................ 340/365 S, 178/17 R, 197/98

[51] Int. Cl. ................ G06f 3/02

[58] Field of Search ................ 340/365 S; 178/17 R; 197/98

[56] References Cited

UNITED STATES PATENTS

| | | | |
|---|---|---|---|
| 3,210,734 | 10/1965 | Andrews et al. | 340/365 S |
| 3,456,077 | 7/1969 | Jones, Jr. | 340/365 S |
| 3,239,608 | 3/1966 | Jones, Jr. | 340/365 S |
| 3,210,743 | 10/1965 | Kaenel | 340/365 S |
| 3,140,467 | 7/1964 | Marcus | 340/365 S |
| 3,500,336 | 3/1970 | Cuccio | 340/365 S |

*Primary Examiner*—John W. Caldwell
*Assistant Examiner*—Robert J. Mooney
*Attorney*—Fred Jacob et al.

[57] ABSTRACT

A keyboard device for entering data into a data processing system. Each selection key on a keyboard is coupled to a switch. Each switch is connected to an encoder through a reactive coupler which converts the switch output to pulse form. The device causes data to be delivered to the encoder in the order in which the selection keys are depressed regardless of how many keys are concurrently depressed.

7 Claims, 6 Drawing Figures

KEYBOARD DATA ENTRY DEVICE EMPLOYING REACTIVE COUPLING CIRCUITS

This application is a continuation of application Ser. No. 17,840 which was filed Mar. 9, 1970. Application Ser. No. 17,840 was a division of application Ser. No. 695,802 which was filed Jan. 4, 1968.

BACKGROUND OF THE INVENTION

This invention relates to a data communication system employing terminal equipment, and more particularly to an improved manually operable electronic keyboard device for transmitting data to business machines which may form a part of an electronic data processing system.

1. Field of the Invention

The invention is particularly utilized in integrated display network systems arranged for information retrieval and data editing functions. The system is capable of generating an alphanumeric display on one or more standard television monitors with its symbol repertoire including alphabetics, numerics, punctuation marks and special symbols.

2. Description of the Prior Art

Present day alphanumeric keyboard devices used as information input terminals for computers, printers, visual display devices and other business data entry apparatus basically are of two types. One type is represented by the Teletype terminal comprising selection keys that operate linkages which encode the output signals mechanically. The mechanical output code is then converted into electrical signals by contact movement, photoelectric cell operation or by some other type of electromechanical transducer. This type of keyboard device is usually mechanically interlocked to prevent double key depression.

The second type of prior art keyboard device is the electronic keyboard terminal which uses switches to directly obtain electrical output signals. This type utilizes multipole coded switches, one actuated by each selection key on the keyboard. Each multipole switch actuates a plurality of switches which provide a coded signal. Another variation of the electronic keyboard utilizes single pole switches, one operated by each key. The output signal of each switch is transmitted through a diode encoder which converts the switch output signal into a coded signal. Prior art keyboard devices of this type usually employ some form of electronic circuit double key strike protection. Some of the keyboard devices energize a light or create an audible signal to indicate that two keys have been depressed.

SUMMARY OF THE INVENTION

The present invention is an electronic keyboard device having a plurality of depressible selection keys. Each key actuates a switch when the key is depressed. Each switch is connected to one terminal of a reactive coupling means. Each reactive coupling means generates an electrical pulse of short duration representative of the key depressed. The other terminal of each reactive coupling means is connected to an encoder which converts the electrical pulses generated into a binary code. The encoder is actuatable sequentially by each switch closure even though previously actuated switches have not been reopened.

Testing by high speed typists operating this keyboard has shown that freedom from mechanical interlocks allows the operator to actually learn to type faster. In fact, so fast that very often a key is fully depressed before the preceding one operated has returned to its normal inactive position. At times, it was found that the typist actually had three different keys in various states of depression.

It is therefore one object of this invention to provide an improved electronic keyboard device.

Another object of this invention is to provide an improved high speed electronic keyboard device operable under burst data input conditions.

A further object of this invention is to provide an improved high speed electronic keyboard device which is free of mechanical interlocks.

A still further object of this invention is to provide an improved high speed data entry terminal for accepting and storing digitally coded data.

Further objects and advantages of the present invention will become apparent to those skilled in the art as the description thereof proceeds.

BRIEF DESCRIPTION OF THE DRAWINGS

The present invention may be more readily described by reference to the accompanying drawings in which:

FIG. 1 is a block diagram of keyboard logic. The keyboard logic performs the functions of converting a mechanical switch closure into parallel electrically coded output signals and converting those parallel output signals into a serial format train of signals which are shifted out as keyboard data to a display controller.

FIG. 1, the keyboard switches and coupling circuits 200 consist of a set of switches, one for each key on the keyboard (not shown), and resistor-capacitor circuits. The keyboard switches and coupling circuits 220 have as many output signals as there are keys on the keyboard. These output signals are transmitted to an encoder 221 which converts them into a seven bit code. In other words, for each key on the keyboard, a seven bit code is generated by the encoder 221. The codes generated by encoder 221 are, of course, outputtted into utilization circuitry. Details of such circuits appear in U.S. Pat. No. 3,543,244, issued on Nov. 24, 1970, to Allen B. J. Cuccio and now assigned to the assignee of this invention. Since the invention claimed in this application pertains to the keyboard-encoder circuitry, the utilization circuitry shall not be discussed.

Figure 2:
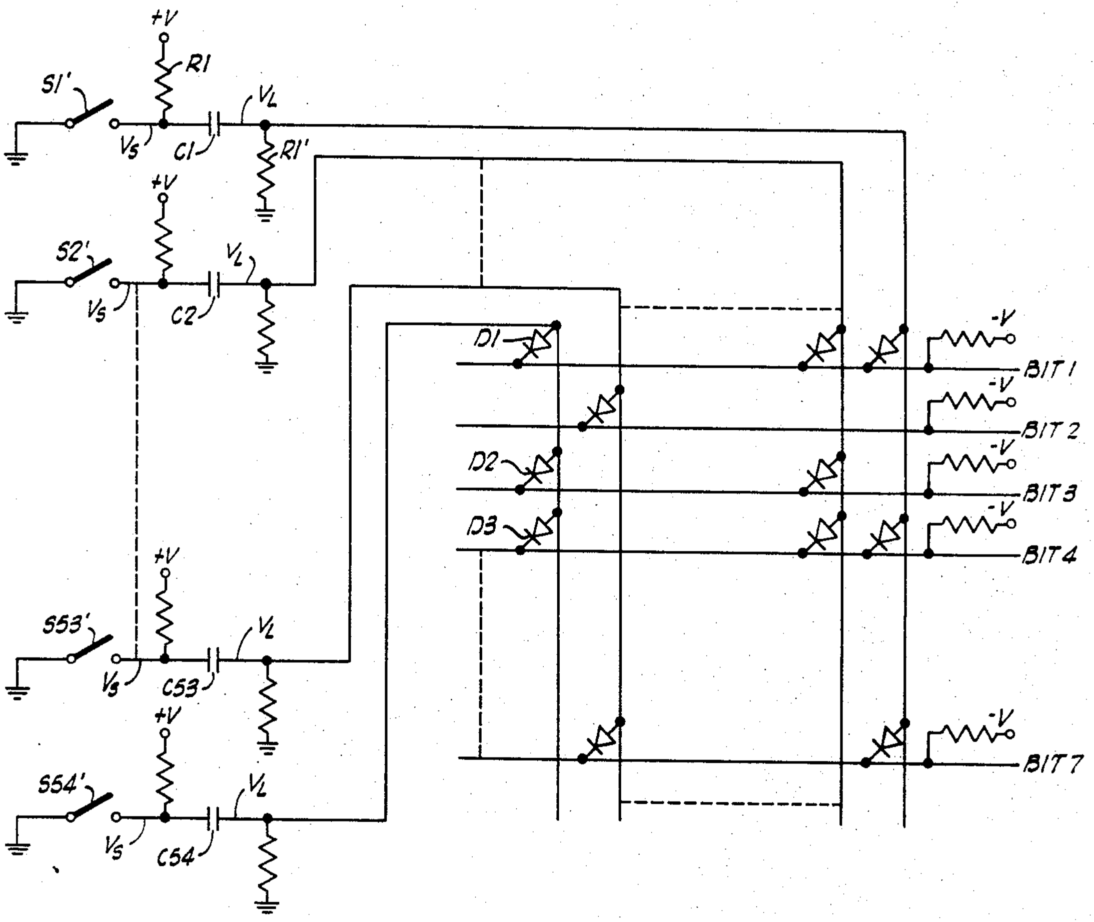
FIG. 2 illustrates in detail the keyboard switches and encoder of FIG. 1.

Some of the details of keyboard switches and encoder logic 220 and 221 are illustrated in FIG. 2. Each switch, s1′ through S54′, shown in the figure corresponds to a key on the keyboard. The capacitors C1 through C54 provide reactive coupling between each keyboard switch and the encoding logic. The encoding logic is represented by the matrix of diodes shown in this figure.

When any one of the switches S1′ through S54′ is closed, its associated capacitor discharges causing a change in the voltage level $V_L$ on the output side of the capacitor. The pulse which is generated passes through the encoding logic which produces the proper coded output signal for use in data utilization circuitry. Until the switch is released, the capacitor is not allowed to charge again so no additional output signals can come from that switch. Thus, when switch S1′ is closed, only one coded signal, corresponding to the closing of switch S1′, is generated. This coded signal cannot be regenerated again until switch S1′ is lifted again allowing capacitor C1 to be recharged. However, while switch S1′ is being held closed, a second key can be depressed causing the switch associated with it to close and the proper coded signal to be generated. Many keys can be depressed in sequence and continuously held down while succeeding keys are depressed without causing errors to occur.

Figure 3:
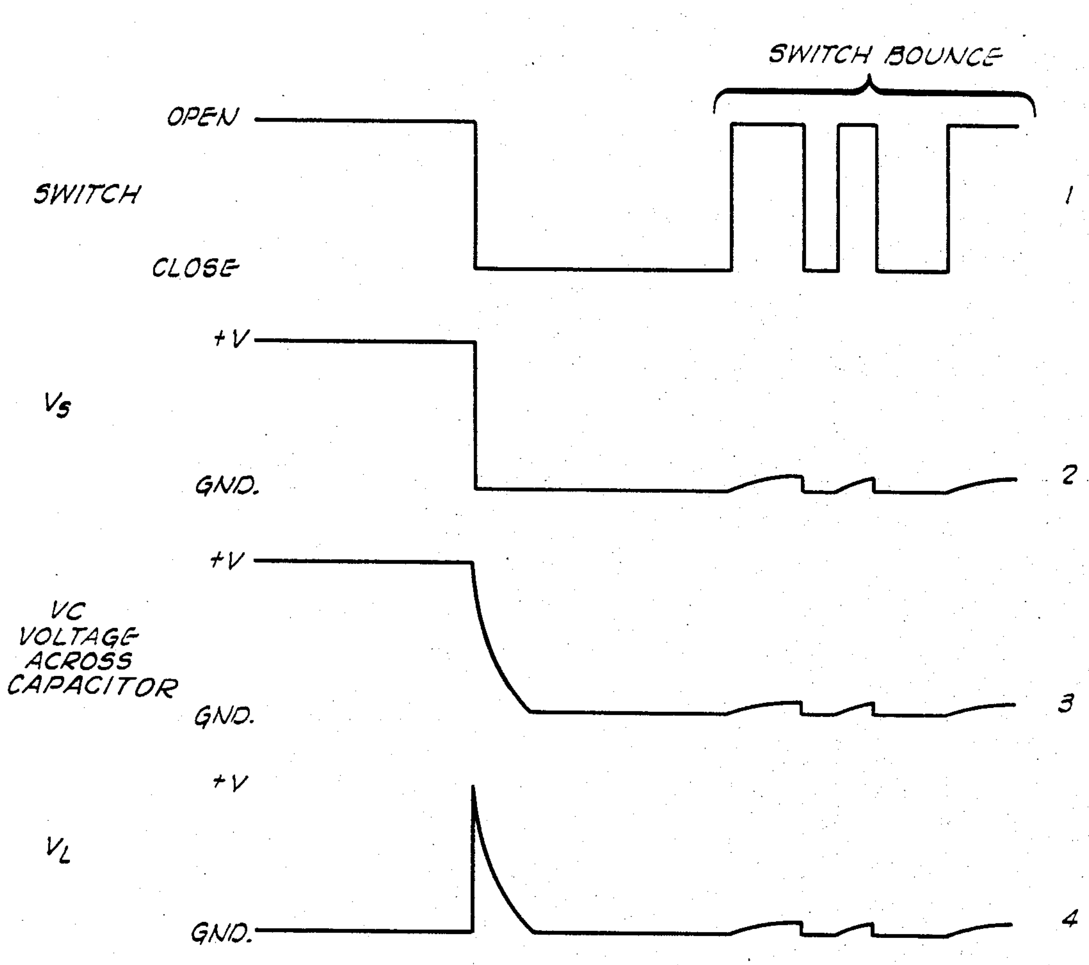
FIG. 3 illustrates the keyboard switch output timing.

FIG. 3 shows in detail the voltage fluctuations at various points in the circuit. Waveform 1 illustrates the opening and closing of a given switch. Note that the switch bounce is shown. The second waveform in the figure illustrates the voltage at point $V_S$ . When the switch is opened, point $V_S$ is at a +V (plus voltage) potential. At the time of closure, the point $V_S$ is grounded through switch S1′ so it will go to ground potential until the switch starts to bounce. Notice that during the switch bounce, the potential at $V_S$ does not rise very far. This is due to the fact that capacitor C1 has had a chance to fully discharge and only begins to very slowly charge during the switch bounce period. But since the capacitor discharges only through resistor R1′ shown in FIG. 3 and charges through both resistors R1′ and R1, its discharge time constant is much shorter than its charge time constant. The difference between the charging and discharging time constants is made larger by employing a small resistance R1′ and a very large resistance R1.

The third waveform shown in FIG. 3 shows the voltage across the capacitor. Notice that, at the time of switch closure, it discharges fairly rapidly but at the time of switch bounce, or when the switch is actually opening, it charges very slowly for the reasons discussed above.

Figure 1:
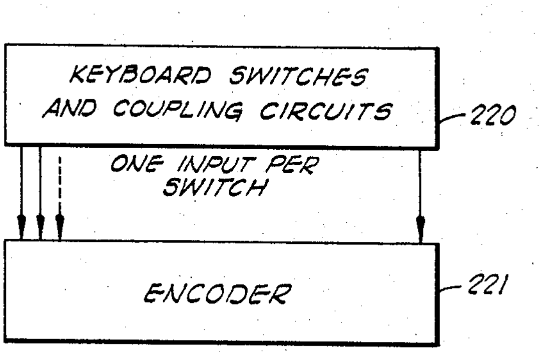
FIG. 1 illustrates in block diagram form the keyboard logic.

The fourth waveform, shown in FIG. 3, illustrates the voltage $V_L$ at the output side of the capacitor. The voltage $V_L$ is equal to the current through resistor R1′ times the resistance value of R1′. Since there is a current through resistor R1′ only during the charge or discharge of capacitor C1, the voltage at $V_L$ at the output side of the capacitor will appear large in magnitude during the discharge of C1 because the current is only limited by resistor R1′. During the charging of capacitor C1, the voltage at $V_L$ will appear very small in magnitude because the current is smaller since it is limited by both resistor R1′ and resistor R1. Thus, voltage $V_L$ will appear as shown in the fourth waveform of this figure. The high voltage spike appears as a pulse to the encoder 221 shown in FIG. 1, while the very low potential pulses due to the switch bounce do not appear as a high enough signal to activate the encoder.

The encoder 221 is a conventional circuit found in many types of data processing equipment. Each switch output signal transmitted to encoder 221 drives a set of diodes such as diodes D1, D2 and D3 shown in FIG. 2. This set of diodes allows the signal generated at the output terminals of any of the switches S1′–S54′ to be transmitted to output terminals labeled bit 1-bit 7. For example, because of the presence of diode D1, switch S54′ when activated generates a signal which passes through diode D1 to the bit 1 output terminal. Notice that for switch S54′ no signal is generated at the bit 2 output terminal while, because of diode D2, a signal is generated at the bit 3 output terminal. Because of diode D3, a signal is generated at the bit 4 output terminal. Therefore, when switch S54′ is activated, an output coded signal which has "ones" for bits 1, 3 and 4 is generated. In a similar manner, other switches will cause other coded output signals to be generated in accordance with the diode arrangement of encoder 221.

Figures 4, 5, 6:
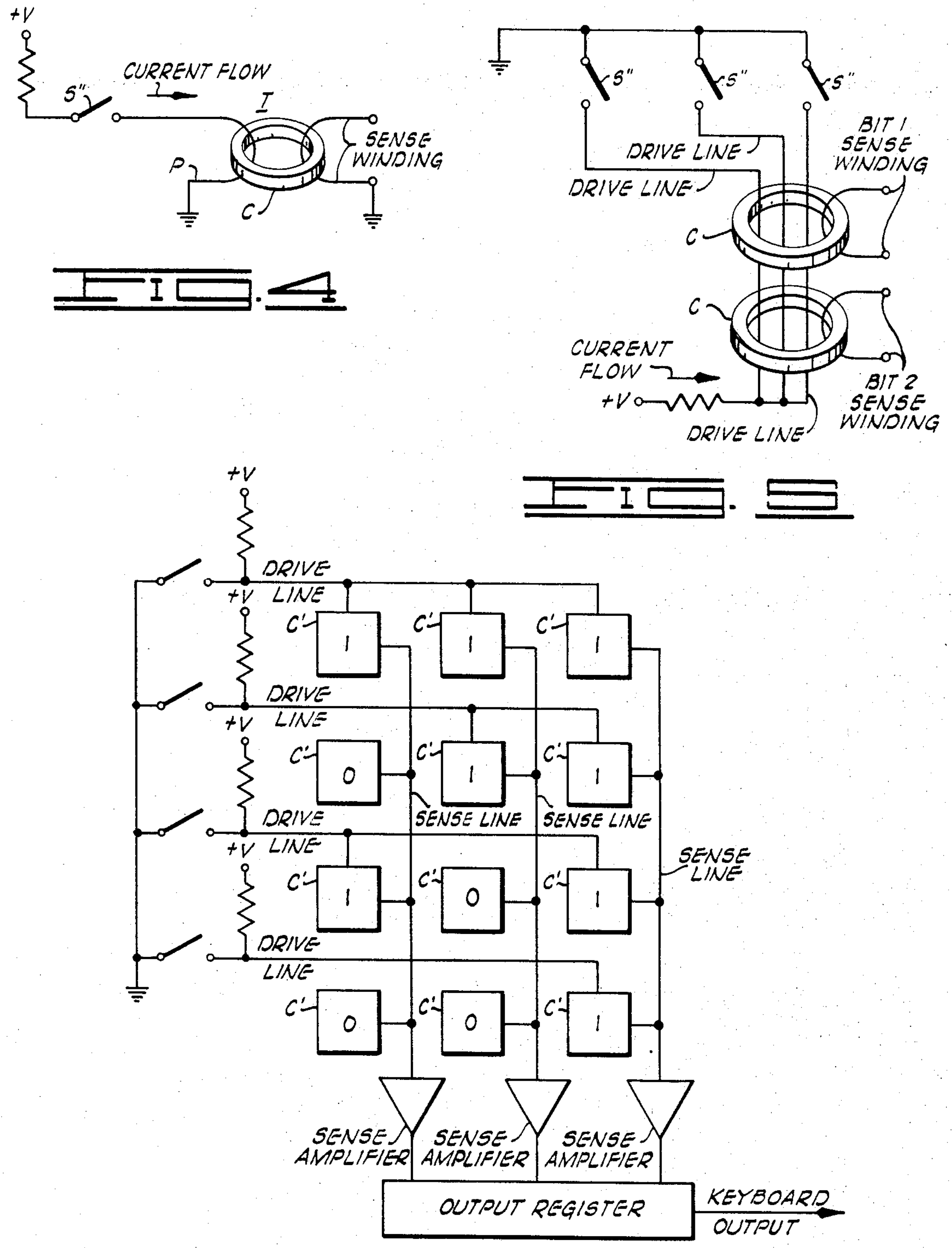
FIG. 4 illustrates a modification of the switch and reactive coupling circuits shown in FIG. 2 utilizing a transformer coupling.
FIG. 5 illustrates a further modification of the switch and reactive coupling means shown in FIGS. 2 and 4 wherein one core per bit is utilized.
FIG. 6 illustrates a still further modification of the structure illustrated in FIG. 2 wherein a linear selection memory utilizing capacitive elements is shown as the reactive coupling and encoder logic.

FIG. 4 illustrates another way of accomplishing the reactive coupling function by utilizing a transformer T comprising a primary winding and a secondary sense winding. When the switch S″ closes, any pulse flowing through the primary winding P is magnetically introduced into the secondary sense winding. No further current flow in the sense winding occurs until after switch S″ is opened and again reclosed. Thus, the effect of the circuit shown in FIG. 4 is similar to the coupling circuits shown in FIG. 2. One of the advantages of the transformer coupling is that the secondary base winding may comprise a multiple of windings, one for each binary bit to be generated. With this approach, both the reactive coupling and the encoder functions shown in FIG. 2 may be performed by one simple circuit.

FIG. 5 illustrates another modification of the reactive coupling arrangement shown in FIGS. 2 and 4 wherein one transformer or core C is utilized per bit generated instead of one core per switch S″. The drive line coupled to each switch S″ passes through only those cores C intended to be actuated.

FIG. 6 illustrates a further modification of the reactive coupling and encoder logic shown in FIG. 2. In this embodiment, a linear selection memory utilizing capactivie elements is shown. Linear selection memory arrays usually comprise, as shown, a matrix of memory elements C′ each positioned to be addressed with predetermined other elements of the matrix A binary word comprising a plurality of binary digits is stored in a row or column of the linear selection matrix array in the form of the presence or absence of binary digits. The linear selection memory may be read by addressing an entire column or row of storage elements simultaneously, and detecting the binary 1's and 0's in the respective bit position of the stored binary word. This parallel reading of the contents of the memory is one of the advantages of a linear selection matrix memory.

In a linear selection memory utilizing capacitive elements as permanent storage devices for binary digits, the presence or absence of capacitive coupling between a sense and drive conductor determines the existance of a binary 1 or a 0. The utilization of capacitive elements permits, as discussed for the reactive coupling arrangements of FIGS. 2, 4 and 5, high speed addressing and readout of the memory array.

The capacitive fixed memory system, as symbolically shown in FIG. 6, its construction and operation, is discussed and described in more detail in U.S. Pat. No. 3, 183, 490, issued May 11, 1965, to John F. Cubbage which is incorporated by reference in this application.

While there have been described preferred embodiments of the present invention, variations and modifications will occur to those skilled in the art. Therefore, it is intended that the appended claims shall be constructed in including all such variations and modifications as fall within the true spirit and scope of the invention.

What is claimed is:

1. A manually operable device for generating digitally coded electrical signals comprising:

a plurality of depressible selection keys;

a plurality of switches coupled to said plurality of keys, each one of said switches being actuated upon depression of a different one of said keys;

a plurality of reactive coupling means, each one of said reactive coupling means having an input side connected to a different switch in said plurality of switches and an output side, each reactive coupling means being responsive to the actuation of the switch connected to its input side to generate an electrical pulse on its output side regardless of whether previously actuated switches remain actuated;

an encoder coupled to the output sides of said plurality of reactive coupling means for sequentially receiving the generated electrical pulses and for generating a digitally coded electrical signal representative of the most recently received electrical pulse whereby the digitally coded electrical signals are generated in the sequence in which said keys are depressed regardless of whether previously depressed keys have been released; and means coupled to said encoder for accepting the digitally coded electrical signals.

2. A sequentially actuatable multichannel transducer for converting mechanical to electrical energy comprising:

a plurality of switches;

a plurality of reactive coupling means, each one of said reactive coupling means having an input side connected to a different switch in said plurality of switches and an output side, each reactive coupling means being responsive to the actuation of the switch connected to its input side to generate an electrical pulse on its output side regardless of whether previously actuated switches remain actuated; and means coupled to the output sides of said reactive coupling means for encoding each electrical pulse generated into a plurality of coded signal pulses.

3. A manually operable electric keyboard for reducing double strike errors comprising:

a plurality of depressible character selection keys;

a plurality of switches coupled to said plurality of keys, each one of said switches being actuated upon depression of a different one of said keys;

a plurality of reactive coupling means, each one of said reactive coupling means having an input side connected to a different switch in said plurality of switchs and an output side, each reactive coupling means being responsive to the actuation of the switch connected to its input side to generate an electrical pulse on its output side regardless of whether previously actuated switches remain actuated; and means for encoding each generated electrical pulse into a plurality of coded signal pulses.

4. The combination set forth in claim 3 wherein each reactive coupling means includes a capacitor having its input side connected to one terminal of a switch in said plurality of switches and its output side connected to said encoding means.

5. The combination recited in claim 4 further including:

a ground terminal;

means connecting the ground terminal to the other terminal of each of the switches in said plurality of switches;

a voltage source;

a first resistor connecting said voltage source to the input side of said capacitor;

a second resistor connecting the output side of said capacitor to said ground terminal; and said capacitor being discharged through said second resistor upon actuation of the associated switch but being charged through both said first and said second resistors upon release of said switch to provide a charging time constant of greater duration than a discharging time constant.

6. The combination set forth in claim 3 wherein said reactive coupling means comprises an inductive means.

7. The combination set forth in claim 3 wherein said reactive coupling means comprises a tranformer.

* * * * *

UNITED STATES PATENT OFFICE
CERTIFICATE OF CORRECTION

Patent No. 3,778,816 Dated December 11, 1973

Inventor(s) ALLEN B. J. CUCCIO

It is certified that error appears in the above-identified patent and that said Letters Patent are hereby corrected as shown below:

On the cover sheet [73[ Assignee, "General Electric Company" should read -- by mesne assignment to Honeywell Information Systems Inc., a corporation of Delaware -- .

Signed and sealed this 6th day of August 1974.

(SEAL)
Attest:

McCOY M. GIBSON, JR.
Attesting Officer

C. MARSHALL DANN
Commissioner of Patents